United States Patent
Asada

[11] Patent Number: 5,088,349
[45] Date of Patent: Feb. 18, 1992

[54] SPEED STAGE SHIFTING OF AUTOMATIC TRANSMISSION WITH MODIFICATION OF TORQUE LOAD IN FRICTION ENGAGING MEANS

[75] Inventor: Toshiyuki Asada, Toyota, Japan

[73] Assignee: Toyota Jidosha Kabushiki Kaisha, Toyota, Japan

[21] Appl. No.: 735,073

[22] Filed: Jul. 24, 1991

[30] Foreign Application Priority Data

Aug. 1, 1990 [JP] Japan ................... 2-204524

[51] Int. Cl.⁵ ............................................. F16H 61/04
[52] U.S. Cl. ........................................ 74/861; 475/151
[58] Field of Search ................... 74/861, 856, 844; 475/257, 151, 153

[56] References Cited

U.S. PATENT DOCUMENTS

| | | | |
|---|---|---|---|
| 4,106,369 | 8/1978 | Taga | 74/868 X |
| 4,222,292 | 9/1980 | Will et al. | 74/861 X |
| 4,346,626 | 8/1982 | Kawamoto | 74/856 X |
| 4,350,058 | 9/1982 | Miller et al. | 74/856 X |
| 4,727,472 | 2/1988 | Deutsch et al. | 74/861 X |
| 4,742,461 | 5/1988 | Eschrich et al. | 74/861 X |
| 4,742,733 | 5/1988 | Schreiner | 74/856 X |
| 4,890,515 | 1/1990 | Taniguchi et al. | 74/861 X |

FOREIGN PATENT DOCUMENTS

2-203064  8/1990  Japan ................... 475/151

Primary Examiner—Leslie A. Braun
Assistant Examiner—William O. Trousdell
Attorney, Agent, or Firm—Oblon, Spivak, McClelland, Maier & Neustadt

[57] ABSTRACT

In shifting speed stages of an automatic transmission by selective engagement and disengagement of friction engaging means, first and second patterns of combination of engagement and disengagement of the friction engaging means are prepared for a certain one speed stage so that a certain one of the friction engaging means bears a first magnitude of torque under the first pattern and a second magnitude of torque greater than the first magnitude of torque under the second pattern, and speed stage shifting to or from the first pattern is carried out through the second pattern.

5 Claims, 2 Drawing Sheets

SPEED STAGE SHIFTING OF AUTOMATIC TRANSMISSION WITH MODIFICATION OF TORQUE LOAD IN FRICTION ENGAGING MEANS

BACKGROUND OF THE INVENTION

1. Field of the Invention

The present invention relates to a method of speed stage shifting of an automatic transmission in a vehicle such as an automobile.

2. Description of the Prior Art

In the automatic transmission in a vehicle such as an automobile which generally comprises a housing and a speed change gear mechanism including a plurality of rotary gear members and a plurality of friction engaging means such as clutches and brakes adapted to be selectively engaged and disengaged for selectively interconnecting said rotary gear members and said housing so as to selectively provide a plurality of speed stages, it is important that, in shifting the speed stages among said plurality of speed stages according to running conditions of the vehicle, engagement or disengagement of the friction engaging means is gradually proceeded at a critical moment when the friction engaging means is put into or out of a substantial engagement, in order to accomplish the speed stage shifting smoothly with no abrupt change of torque being induced in the speed change gear mechanism or in the housing of the automatic transmission which supports the speed change gear mechanism with reaction.

Conventionally, such a gradual engagement or disengagement of the friction engaging means at the critical moment is generally obtained by holding the hydraulic pressure which is being supplied to or exhausted from one of the friction engaging means to be engaged or disengaged at an intermediate level for a certain period so that in the meantime a sliding engagement is available in the friction engaging means. When one friction engaging means is disengaged while another friction engaging means is engaged for the speed stage shifting, the exhaust of the hydraulic pressure from said one friction engaging means and the supply of the hydraulic pressure to said other friction engaging means are generally so controlled that the temporal holding of the hydraulic pressure at an intermediate level in the exhaust process overlaps the temporal holding of the hydraulic pressure at an intermediate level in the supply process. Such an art is shown in, for example, U.S. Pat. No. 4,722,247, although the art itself is conventional and not the subject of said U.S. patent.

However, such a control of the hydraulic pressure requires a delicate control operation of hydraulic pressure control means including valves for controlling supply or exhaust of the hydraulic fluid to or from the friction engaging means, valves for controlling the flow of the hydraulic fluid bypassing the friction engaging means, fluid pressure accumulators, back pressure control means for those accumulators, etc..

SUMMARY OF THE INVENTION

It is the object of the present invention to provide a novel method of controlling an automatic transmission for the speed stage shifting, wherein a temporal sliding engagement of the friction engaging means is available for any desired period in the process of speed stage shifting with no need of such a holding of the intermediate pressure as in the conventional method.

According to the present invention, the above-mentioned object is accomplished by a method of controlling an automatic transmission comprising a housing and a speed change gear mechanism including a plurality of rotary gear members and a plurality of friction engaging means adapted to be selectively engaged and disengaged for selectively interconnecting said rotary gear members and said housing so as to selectively provide a plurality of speed stages, a certain one of said plurality of speed stages being available by first and second patterns of combination of engagement and disengagement of said friction engaging means with a certain one of said friction engaging means bearing a first magnitude of torque under said first pattern of combination of engagement and disengagement of said friction engaging means and a second magnitude of torque greater than said first magnitude of torque under said second pattern of combination of engagement and disengagement of said friction engaging means, wherein a speed stage shifting to change a pattern of combination of engagement and disengagement of said friction engaging means at least either to or from said first pattern of combination of engagement and disengagement of said friction engaging means is carried out through said second pattern of combination of engagement and disengagement of said friction engaging means.

When the speed stage of the automatic transmission is shifted to or from said certain one speed stage according to the above-mentioned method, said certain one friction engaging means which may be so constructed as to be able to bear said first magnitude of torque for the automatic transmission being normally operable at said certain one speed stage under said first pattern of combination of engagement and disengagement of the friction engaging means but unable to bear said second magnitude of torque, will operate in a sliding engagement when the combination of engagement and disengagement of the friction engaging means is set to said second pattern with no modification of the hydraulic pressure supplied to said certain one friciton engaging means, providing a damping effect against any abrupt change of torque the speed stage shifting.

In carrying out the method according to the present invention, said plurality of speed stages may include normally used forward speed stages including a stage provided by said first pattern of combination of engagement and disengagement of said friction engaging means, and said certain one friction engaging means can bear torque load imposed thereon in all said normally used forward speed stages with no boosting of force for engagement thereof.

Or, in carrying out the method according to the present invention, said plurality of speed stages may include normally used forward speed stages including a stage provided by said first pattern of combination of engagement and disengagement of said friction engaging means, and said certain one friction engaging means can bear torque load imposed thereon in all said normally used forward speed stages with no boosting of force for engagement thereof, except a speed stage lower than said stage provided by said first pattern of combination of engagement and disengagement of said friction engaging means.

In carrying out the method according to the present invention, said certain one friction engaging means may be disengaged after said speed stage shifting, or may operate in non sliding engagement after said speed stage shifting.

BRIEF DESCRIPTION OF THE DRAWINGS

In the accompanying drawings.

DESCRIPTION OF THE PREFERRED EMBODIMENTS

In the following the present invention will be described in more detail with respect to some embodiments thereof with reference to the accompanying drawings.

Figure 1:
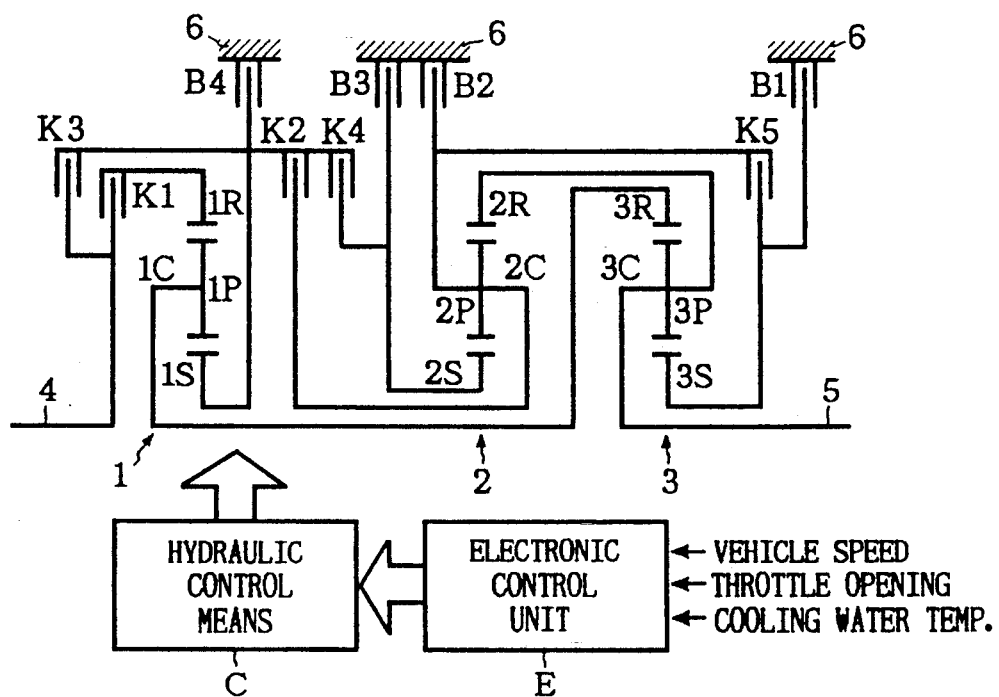
FIG. 1 is a diagrammatical illustration of a first automatic transmission to which the method of control according to the present invention is applicable.

Referring to FIG. 1, the automatic transmission herein shown comprises a speed change gear mechanism including three planetary gear mechanisms generally designated by reference numerals 1, 2 and 3, respectively. The planetary gear mechanism 1 comprises a sun gear 1S, a ring gear 1R, a plurality of planetary pinions 1P only one of which is shown in the figure, and a carrier 1C supporting the planetary pinions 1P to be rotatable as a whole about an axis of rotation common with those of the sun gear 1S and the ring gear 1R. The planetary gear mechanisms 2 and 3 have constructions similar to that of the planetary gear mechanism 1. So the planetary gear mechanisms 2 and 3 comprise sun gears 2S and 3S, ring gears 2R and 3R, planetary pinions 2P and 3P, and carriers 2C and 3C, respectively. An input shaft is designated by reference numeral 4, while an output shaft is designated by reference numeral 5. Reference numerals 6 designate several portions of a housing of the automatic transmission.

The speed change gear mechanism further includes clutches K1, K2, K3, K4 and K5, each having a first friction member diagrammatically shown as an outer race member having a pair of spaced friction engaging elements only for the convenience of illustration and a second friction member diagrammatically illustrated as an inner race member adapted to be selectively clamped between said pair of friction elements of said outer race member also only for the convenience of illustration. The speed change gear mechanism also includes brakes B1, B2, B3 and B4, each having a first friction member diagrammatically shown as an outer race member having a pair of spaced friction engaging elements also only for the convenience of illustration and a second friction member diagrammatically illustrated as an inner race member adapted to be selectively clamped between said pair of friction elements of said outer race member also only for the convenience of illustration.

As illustrated in FIG. 1, the input shaft 4 is connected, in parallel, with the inner race members of the clutches K1 and K3. The outer race member of the clutch K1 is connected with the ring gear 1R. The outer race member of the clutch K3 is connected, in parallel, with the sun gear 1S, the outer race members of the clutches K2 and K4 and the inner race member of the brake B4. The outer race member of the brake B4 is connected with the housing 6. The carrier 1C is connected with the ring gear 3R. The inner race member of the clutch K2 is connected with the carrier 2C. The inner race member of the clutch K4 is connected, in parallel, with the sun gear 2S and the inner race member of the brake B3. The outer race member of the brake B3 is connected with the housing 6. The carrier 2C is also connected, in parallel, with the inner race member of the brake B2 and the outer race member of the clutch K5. The outer race member of the brake B2 is connected with the housing 6. The ring gear 2R is connected with the carrier 3C which in turn is connected with the output shaft 5. The inner race member of the clutch K5 is connected, in parallel, with the sun gear 3S and the inner race member of the brake B1. The outer race member of the brake B1 is connected with the housing 6.

The clutches K1-K5 and the brakes B1-B4 are all of the type operated by hydraulic actuators. Supply and exhaust of certain hydraulic pressures to and from these hydraulic actuators are controlled by a hydraulic control means C diagrammatically shown by a block. The hydraulic control means C is controlled by an electronic control unit E also diagrammatically shown by a block. The electronic control unit is supplied with input signals such as vehicle speed, throttle opening and cooling water temperature as a principal part of information based upon which the electronic control unit E computes a desired operating condition of the automatic transmission and controls the hydraulic control means C so as to shift the speed stages of the automatic transmission.

The speed change gear mechanism shown in FIG. 1 can provide various speed stages according to selective engagement of the clutches K1-K5 and brakes B1-B4 as shown in TABLE 1.

In TABLE 1, the speed stages available are shown in column S, wherein "1" indicates the so-called 1st or the lowest speed stage, "2" indicates the so-called 2nd speed stage, "3" indicates the so-called 3rd speed stage, "4" indicates the so-called 4th speed stage, "5" indicates the so-called 5th speed stage, and "R" indicates the reverse stage. In addition to these popular speed stages, the speed change gear mechanism shown in FIG. 1 can provide intermediate speed stages such as "2.2", "2.5" and "2.7" of gradually increasing reduction gear ratios between the 2nd speed stage and the 3rd speed stage, and intermediate speed stages such as "3.2" and "3.5" of gradually increasing reduction gear ratios between the 3rd speed stage and the 4th speed stage.

Further, as shown in TABLE 1, this speed change gear mechanism can provides three different kinds of 1st speed stage such as "a", "b" and "c" by different combinations of engagement (and therefore disengagement according to a reversed view) of the clutches and the brakes, each such selective combination of engagement of the clutches and the brakes being referred to hereinunder as a pattern of combination of engagement and disengagement of the friction engaging means, or sometimes only as a pattern. Similarly, this speed change gear mechanism can provide seven kinds of 2nd speed stages such as "a" to "g", three kinds of 2.5 speed stage such as "a" to "c", two kinds of 3rd speed stage such as "a" and "b", four kinds of 4th speed such as "a" to "d", and two kinds of reverse speed stage such as "a" and "b" according to different patterns of combination engagement of the friction engaging means.

The numerical values in columns K1-K5 and B1-B4 indicate that the corresponding clutches and brakes are engaged to provide the corresponding speed stage, respectively, and also show the magnitudes of torque to be borne by the corresponding clutches and brakes, respectively, provided that an input torque of the magnitude of 1.00 is imposed on the input shaft 4. Therefore, for example, when the clutches K1 and K4 and the brakes B1 and B2 are engaged, the kind "a" of the 1st speed stage (referred to as "1-a" stage, and so on hereinunder) is established with the clutch K1 bearing a torque of the magnitude of 1.00, the clutch K4 bearing a torque of the magnitude of 0.45, the brake B1 bearing a torque of the magnitude of 0.59 and the brake B2 bearing a torque of the magnitude of 1.56 when an input torque of the magnitude of 1.00 is imposed on the input shaft 4. These combinations of shares of torque load are based upon the condition that the gear ratios between the sun gear and the ring gear in the planetary gear mechanisms 1, 2 and 3 are 0.450, 0.405 and 0.405, respectively.

In this connection, it is to be noted that the combination of engagement of the clutches and/or brakes for each speed stage or each kind of a speed stage shows each necessary minimum combination of the clutches and brakes to be engaged for providing the corresponding stage. This does not mean that no other clutch or brake be engaged. Some of the clutches and the brakes may be engaged in addition to those forming the respective patterns shown in the table. For example, in order to provide 1-a stage, it is essential that clutches K1 and K4 and the brakes B1 and B2 are engaged. 1-b stage is obtained by modifying 1-a stage so that the brake B1 which holds the sun gear 3S against rotation is disengaged, and as a substitute therefor, the clutch K5 is engaged to hold the sun gear 3S against rotation from the brake B2. Therefore, in 1-b stage, the brake B1 may also be engaged. Similarly, 1-c stage is obtained by modifying 1-a stage so that the brake B2 which holds the carrier 2C against rotation is disengaged, and as a substitute therefor, the clutch K5 is engaged to hold the carrier 2C from the brake B1, or is also obtained as modified from 1-b stage so that the responsibility of holding the combination of the sun gear 3S and the carrier 2C by the clutch K5 against rotation is transferred from the brake B2 to the brake B1. Therefore, in 1-b and 1-c stages, both of the brakes B1 and B2 may be engaged. However, the sharing of the torque among respective clutches and brakes changes from those shown in the table.

Further, in TABLE 1, the reduction gear ratios available in the respective speed stages are shown in column X.

Now, let us refer to 4-c stage, wherein the clutches K1, K2, K4 and K5 need to be engaged at torque 1.00, 0.87, 0.42 and 0.59, respectively. It is assumed that this stage is adopted for the normal use for providing the 4th speed stage. If the clutch K1 is designed for torque 1.00, it is operable in all of the stages 1-a to R-a. Although the clutch K2 bears a torque of 0.87 in stage 4-c, since it must bear a torque of 1.00 in 5 stage, this clutch will have to be designed for a torque of 1.00. With respect to the clutch K4, if it is designed for a torque of 0.45, it is operable in any of the stages, except R stage. It is practically readily available to apply a boosting to the hydraulic pressure when the manual lever is shifted to the reverse position. Therefore, it will be enough for the clutch K4 being designed for a torque of 0.45 for all forward speed stages. The clutch K5 may be designed for a torque of 0.59, if 1-c stage is avoided, and R-b stage is avoided or the hydraulic pressure is boosted in the reverse range. Further, although the clutch K3 is not used in 4-c stage, this clutch is designed for a torque of 1.00 for use in the 5th stage.

When the clutches K1, K2, K3, K4 and K5 are designed for the above-mentioned torque capacities for the normal operation at the 4th speed stage, if the pattern of combination of engagement of clutches is set up at the one corresponding to 4-a stage, the clutch K2 designed for torque 1.00 will slide, because it is imposed with a torque of 1.41. Therefore, if the speed stage shifting from the 4th speed stage to other speed stage such as the 5th speed stage or the 3rd speed stage or to the 4th speed from other speed stage such as the 5th speed stage or the 3rd speed stage is carried out through 4-a stage, a temporal sliding engagement of the clutch K2 is automatically obtained with no modification of the level of the hydraulic pressure. In this case, when the speed change gear mechanism is shifted up to the 5th speed stage from 4-c stage through 4-a stage, the clutch K2 is put into full engagement after the temporal sliding engagement, while when the speed change gear mechanism is shifted down to the 3rd speed stage from 4-c stage through 4-a stage, the clutch K2 is disengaged after the temporal sliding engagement.

Similarly, if 2-e stage is adopted for the normal use for providing the 2nd speed stage with the brake B2 being designed for a torque of 0.59 and not to be used in the 1st speed stage and the reverse stage or boosted when used in those stages, as the hydraulic pressure is sometimes boosted in those very low speed stages as a higher torque is imposed on a rotary member because of a lower rotation speed thereof, and if the speed stage shifting from the 2nd speed stage to other speed stage such as the 3rd speed stage or the 1st speed stage or to the 3rd speed stage from other speed stage such as the 3rd speed stage or the 1st speed stages is carried out through 2-b stage, a temporal sliding engagement of the brake B2 is obtained. Thus, by the combination of the above two examples, the speed stage shiftings among the 1st, 2nd, 3rd, 4th and 5th speed stages are all carried out with a damping effect available by the temporal sliding engagement of one of the friction engaging means bearing the torque transmitted, with no need of modification of the level of the hydraulic pressure operating the clutches and the brakes.

Figure 2:
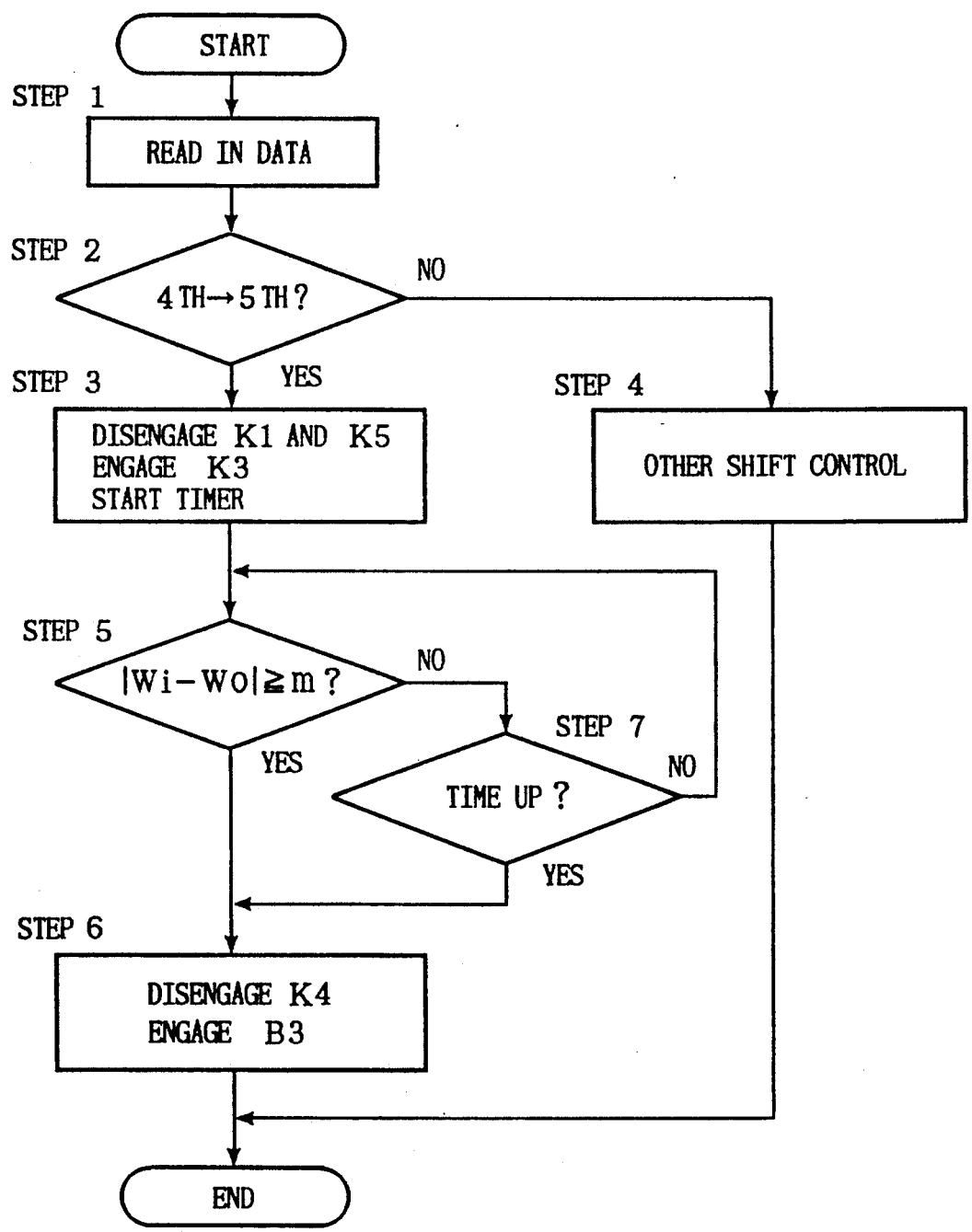
FIG. 2 is a flow chart showing a process of shifting over the speed stage from 4th speed stage to 5th speed stage as an example of the speed stage shifting according to the present invention.

FIG. 2 is a flow chart showing, as an example, the process of controlling the automatic transmission shown in FIG. 1 so as to shift over the speed stage from the 4th speed stage to the 5th speed stage when 4-c stage is normally adopted for the 4th speed stage and 4-a stage is adopted for the temporal speed stage as described above.

After the start of the control process, in step 1, data such as vehicle speed, throttle opening and cooling water temperature are read in. Then the control process proceeds to step 2.

In step 2, it is judged, based upon the read in data, if the 4th to 5th shift up is to be conducted. If the answer is "yes", the control process proceeds to step 3, whereas if the answer is "no", the control process proceeds to step 4 so that other shift control is conducted.

In step 3, the clutches K1 and K5 are disengaged, while the clutch K3 is engaged, to shift over the stage from 4-c stage to 4-a stage. At the same time a timer is started. Then the control process proceeds to step 5.

In step 5, it is judges if the absolute value of the difference between the rotational speed of the input shaft 4, denoted Wi, and the rotational speed of the output shaft 5, denoted Wo, is equal to or greater than a certain predetermined amount "m". Although there should be normally no difference between Wi and Wo in the same 4th speed stage having the gear ratio 1.00, if the clutch K2 is designed to have a torque load capacity enough to bear a torque of 1.00 but not enough to bear a torque of 1.41, it starts to slide in 4-a stage, so that the input shaft 4 will run over the output shaft 5 in an engine driving or will run under in an engine braking. When the sliding of the clutch K2 reaches a desired amount corresponding to the difference "m", i.e. when the answer in step 5 turns into "yes", the control process proceeds to step 6, whereas until then, i.e. as long as the answer is "no", the control process proceeds to step 7. In step 7, however, it is judged if the timer started at step 3 has counted a time predetermined not to affect the desired responsiveness of the automatic transmission, and if the answer is "yes", the control process proceeds to step 6, whereas if the answer is "no", the control process returns before step 5.

In step 6, the clutch K4 is disengaged, while the brake B3 is engaged, to shift over the speed stage from 4-a stage to the 5th speed stage. Although a torque shock absorptivity is available by the sliding of the clutch K2, the process of changing over the engagement and disengagement of the clutch K4 and the brake B3 may be conducted by employing any conventional art of coordination of gradual supply and exhaust of hydraulic pressure to and from the respective friction engaging means. In such a process the rotational speed of the inner race member of the brake B3 may be used as a signal indicating the progress of the change over as it decreases to zero toward the completion of the shift up.

Figure 3:
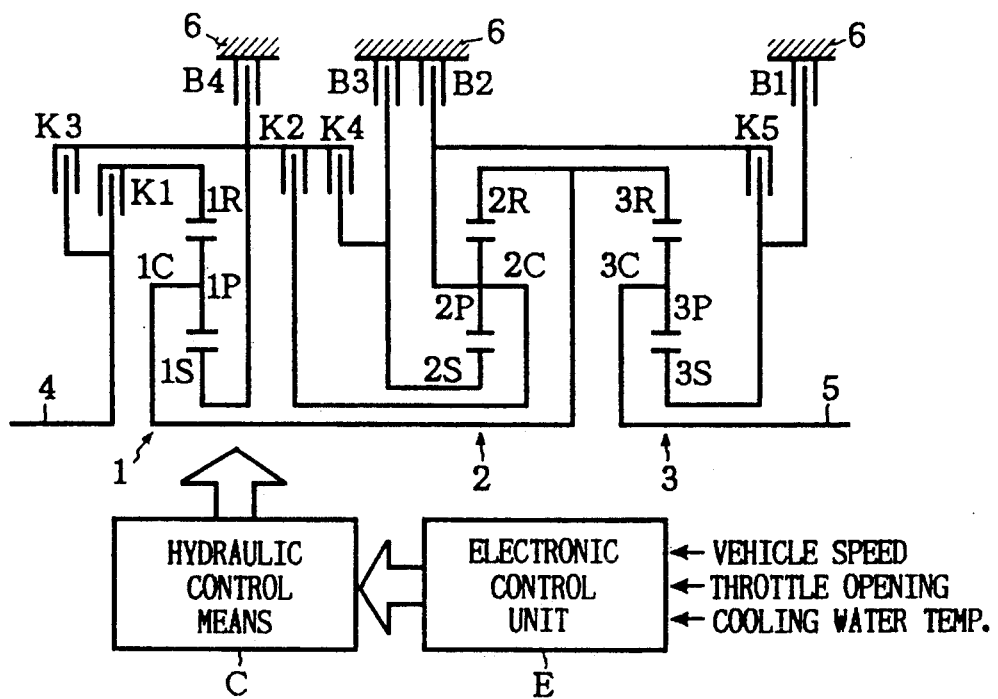
FIG. 3 is a diagrammatical illustration similar to FIG. 1 showing another automatic transmission to which the method of control according to the present invention is also applicable.

The automatic transmission shown in FIG. 3 is different from that shown in FIG. 1 only in that the ring gear 2R is connected with the ring gear 3R, instead of the carrier 3C. Therefore, further detailed descriptions with regard to the construction of the automatic transmission shown in FIG. 3 will be omitted in order to avoid repetitions of similar descriptions. However, the gear ratios between the sun gear and the ring gear in the planetary gear mechanisms 1, 2 and 3 in this speed change gear mechanism are 0.450, 0,569 and 0.405, respectively.

The data with respect to the speed change gear mechanism of the automatic transmission shown in FIG. 3 are given in TABLE 2 in the same manner as in TABLE 1. In this case, the 1st speed stage is available in three kinds of stages 1-a, 1-b and 1-c, the 2nd speed stage is available in four kinds of stages 2-a, 2-b, 2-c and 2-d, the 3rd speed stage is available in four kinds of stages 3-a, 3-b, 3-c and 3-d, the 4th speed stage is available in four kinds of stages 4-a, 4-b, 4-c and 4-d, the 5th speed stage is available in a single kind, and the reverse stage is available in three kinds of stages R-a, R-b and R-c. In addition to those popular stages, 2.2, 2.5, 3.2, 3.5 and 4.5 speed stages are available according to the shown data.

According to the same inventive concept as applied to the automatic transmission shown in FIG. 1, also in the automatic transmission shown in FIG. 3 the speed stage shifting can be carried out through a temporal stage not normally used for providing the corresponding speed stage for the purpose of obtaining the temporal sliding engagement of a clutch or a brake. So, for example, the torque bearing capacities of the clutches K1, K2, K3, K4 and K5 and the brake B1 may be designed for torques of 1.00, 1.00, 1.00, 0.45, 0.59 and 0.59, respectively, and the change-over of speed stages from the 4th speed stage to other speed stages or to the 4th speed stage from other speed stages may be carried out temporally through 4-d, and further, the speed stage shifting from the 2nd speed stage to other speed stages or to the 2nd speed stage from other speed stages may be carried out temporarily through 2-c stage.

Although the invention has been described in detail with respect to some preferred embodiments thereof, it will be appreciated that the inventive concept of the present invention can be carried out by various embodiments without departing from the scope of the present invention.

TABLE 1

| S | | K1 | K2 | K3 | K4 | K5 | B1 | B2 | B3 | B4 | X |
|---|---|---|---|---|---|---|---|---|---|---|---|
| 1 | a | 1.00 | | | 0.45 | | 0.59 | 1.56 | | | 3.149 |
|   | b | 1.00 | | | 0.45 | 0.59 | | 2.15 | | | |
|   | c | 1.00 | | | 0.45 | 1.56 | 2.15 | | | | |
| 2 | a | 1.00 | | | | | 0.59 | | | 0.45 | 2.037 |
|   | b | 1.00 | 0.45 | | | | 0.59 | 1.04 | | | |
|   | c | 1.00 | | | 0.45 | | 0.59 | | 0.45 | | |
|   | d | 1.00 | 0.45 | | | 0.45 | 1.04 | | | | |
|   | e | 1.00 | | | | 0.59 | | 0.59 | | 0.45 | |
|   | f | 1.00 | 0.59 | | | 0.59 | | | | 1.04 | |
|   | g | 1.00 | 0.45 | | | 0.59 | | 1.04 | | | |
| 2.2 | | 1.00 | 0.45 | | | | 0.59 | | 0.13 | | 1.717 |
| 2.5 | a | 1.00 | | | 0.45 | 0.59 | | | 0.62 | | 1.619 |
|   | b | 1.00 | | | 0.17 | 0.59 | | | | 0.62 | |
|   | c | 1.00 | | | | 0.59 | | | 0.17 | 0.45 | |
| 2.7 | | 1.00 | 0.63 | | 0.18 | | 0.59 | | | | 1.587 |
| 3 | a | 0.69 | | 0.31 | | | 0.41 | | | | 1.405 |
|   | b | 0.69 | | 0.31 | | 0.41 | | 0.41 | | | |
| 3.2 | | 1.00 | 0.45 | | | | 0.59 | | 0.30 | | 1.299 |
| 3.5 | | 0.69 | | 0.31 | | 0.41 | | | 0.12 | | 1.117 |
| 4 | a | | 1.41 | 1.00 | 0.41 | | | | | | 1.000 |
|   | b | 0.49 | 0.29 | 0.51 | | 0.29 | | | | | |
|   | c | 1.00 | 0.87 | | 0.42 | 0.59 | | | | | |
|   | d | 0.62 | | 0.38 | 0.10 | 0.36 | | | | | |
| 5 | | | 1.00 | 1.00 | | | | | 0.29 | | 0.712 |
| R | a | | | 1.00 | 1.00 | | | | 3.47 | | 2.469 |
|   | b | | | 1.00 | 1.00 | 3.47 | 3.47 | | | | |

TABLE 2

| S | | K1 | K2 | K3 | K4 | K5 | B1 | B2 | B3 | B4 | X |
|---|---|---|---|---|---|---|---|---|---|---|---|
| 1 | a | 1.00 | | | 0.45 | | 0.59 | 1.56 | | | 3.149 |
| | b | 1.00 | | | 0.45 | 0.59 | | 2.15 | | | |
| | c | 1.00 | | | 0.45 | 1.56 | 2.15 | | | | |
| 2 | a | 1.00 | 0.45 | | | | 0.59 | 0.45 | | | 2.037 |
| | b | 1.00 | 0.45 | | | 0.59 | | 1.04 | | | |
| | c | 1.00 | 0.45 | | | 0.45 | 1.04 | | 0.45 | | |
| | d | 1.00 | | | 0.45 | | 0.59 | | 0.45 | | |
| 2.2 | | 1.00 | 0.45 | | | | 0.47 | | 0.16 | | 1.634 |
| 2.5 | | 1.00 | | | 0.45 | 0.47 | | | 0.62 | | 1.619 |
| 3 | a | 0.69 | 0.31 | | | | 0.41 | | | | 1.405 |
| | b | 0.69 | 0.31 | | | 0.41 | | 0.41 | | | |
| | c | 1.00 | 0.71 | | 0.26 | | 0.41 | | | | |
| | d | | 1.57 | 1.00 | 0.57 | | 0.41 | | | | |
| 3.2 | | 1.00 | 0.45 | | | 0.38 | | | 0.30 | | 1.299 |
| 3.5 | | 0.69 | | 0.31 | | 0.32 | | | 0.12 | | 1.117 |
| 4 | a | 0.49 | 0.29 | 0.51 | | 0.29 | | | | | 1.000 |
| | b | 1.00 | 0.86 | | 0.42 | 0.29 | | | | | |
| | c | 0.62 | | 0.38 | 0.10 | 0.29 | | | | | |
| | d | | 1.40 | 1.00 | 0.40 | 0.29 | | | | | |
| 4.5 | | | 1.00 | 1.00 | | | 0.26 | | 0.36 | | 0.895 |
| 5 | | | 1.00 | 1.00 | | 0.20 | | | 0.29 | | 0.712 |
| R | a | | | 1.00 | 1.00 | 2.76 | 3.47 | | | | 2.469 |
| | b | | | 1.00 | 1.00 | 0.71 | | | 3.47 | | |
| | c | | | 1.00 | 1.00 | | 0.71 | 2.76 | | | |

I claim:

1. A method of controlling an automatic transmission comprising a housing and a speed change gear mechanism including a plurality of rotary gear members and a plurality of friction engaging means adapted to be selectively engaged and disengaged for selectively interconnecting said rotary gear members and said housing so as to selectively provide a plurality of speed stages, a certain one of said plurality of speed stages being available by first and second patterns of combination of engagement and disengagement of said friction engaging means with a certain one of said friction engaging means bearing a first magnitude of torque under said first pattern of combination of engagement and disengagement of said friction engaging means and a second magnitude of torque greater than said first magnitude of torque under said second pattern of combination of engagement and disengagement of said friction engaging means, wherein a speed stage shifting to change a pattern of combination of engagement and disengagement of said friction engaging means at least either to or from said first pattern of combination of engagement and disengagement of said friction engaging means is carried out through said second pattern of combination of engagement and disengagement of said friction engaging means.

2. A method of controlling an automatic transmission according to claim 1, wherein said plurality of speed stages include normally used forward speed stages including a stage provided by said first pattern of combination of engagement and disengagement of said friction engaging means, and said certain one friction engaging means can bear torque load imposed thereon in all said normally used forward speed stages with no boosting of force for engagement thereof.

3. A method of controlling an automatic transmission according to claim 1, wherein said plurality of speed stages include normally used forward speed stages including a stage provided by said first pattern of combination of engagement and disengagement of said friction engaging means, and said certain one friction engaging means can bear torque load imposed thereon in all said normally used forward speed stages with no boosting of force for engagement thereof, except a speed stage lower than said stage provided by said first pattern of combination of engagement and disengagement of said friction engaging means.

4. A method of controlling an automatic transmission according to claim 1, wherein said certain one friction engaging means is disengaged after said speed stage shifting.

5. A method of controlling an automatic transmission according to claim 1, wherein said certain one friction engaging means operates in non sliding engagement after said speed stage shifting.

* * * * *